United States Patent [19]

Stangl et al.

[11] 4,100,829

[45] Jul. 18, 1978

[54] APPARATUS FOR SHEARING METALLIC BARS

[75] Inventors: Ernst Stangl, Remscheid-Reinshagen; Rolf Gies, Remscheid-Goldenberg; Hans-Jürgen Model; Edgar Stengel, both of Remscheid, all of Germany

[73] Assignee: AEG-Elotherm, G.m.b.H., Remscheid-Hasten, Germany

[21] Appl. No.: 808,629

[22] Filed: Jun. 21, 1977

[30] Foreign Application Priority Data

Jul. 16, 1976 [DE] Fed. Rep. of Germany ....... 2631989

[51] Int. Cl.² .............................................. B26D 5/20

[52] U.S. Cl. ....................................... 83/106; 83/268; 83/277; 83/282; 83/453

[58] Field of Search ................. 83/268, 277, 282, 390, 83/453, 106

[56] References Cited

U.S. PATENT DOCUMENTS

| | | | |
|---|---|---|---|
| 3,054,316 | 9/1962 | Pearson | 83/390 |
| 3,605,538 | 9/1971 | Bohmer et al. | 83/268 X |
| 3,727,500 | 4/1973 | Breetvelt | 83/453 X |

FOREIGN PATENT DOCUMENTS 448,531  8/1927  Fed. Rep. of Germany ......... 83/282

*Primary Examiner*—Willie G. Abercrombie
*Attorney, Agent, or Firm*—Cushman, Darby & Cushman

[57] ABSTRACT

A shearing apparatus in which heated metal is transported to a shearing position, clamped and sheared. After clamping, a force is applied along the longitudinal direction of the bars and, if movement is detected, the incorrectly dimensioned bar is discarded.

4 Claims, 2 Drawing Figures

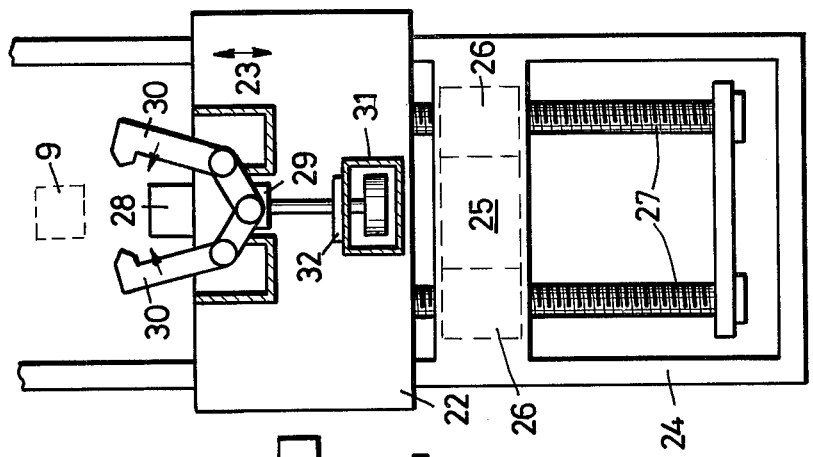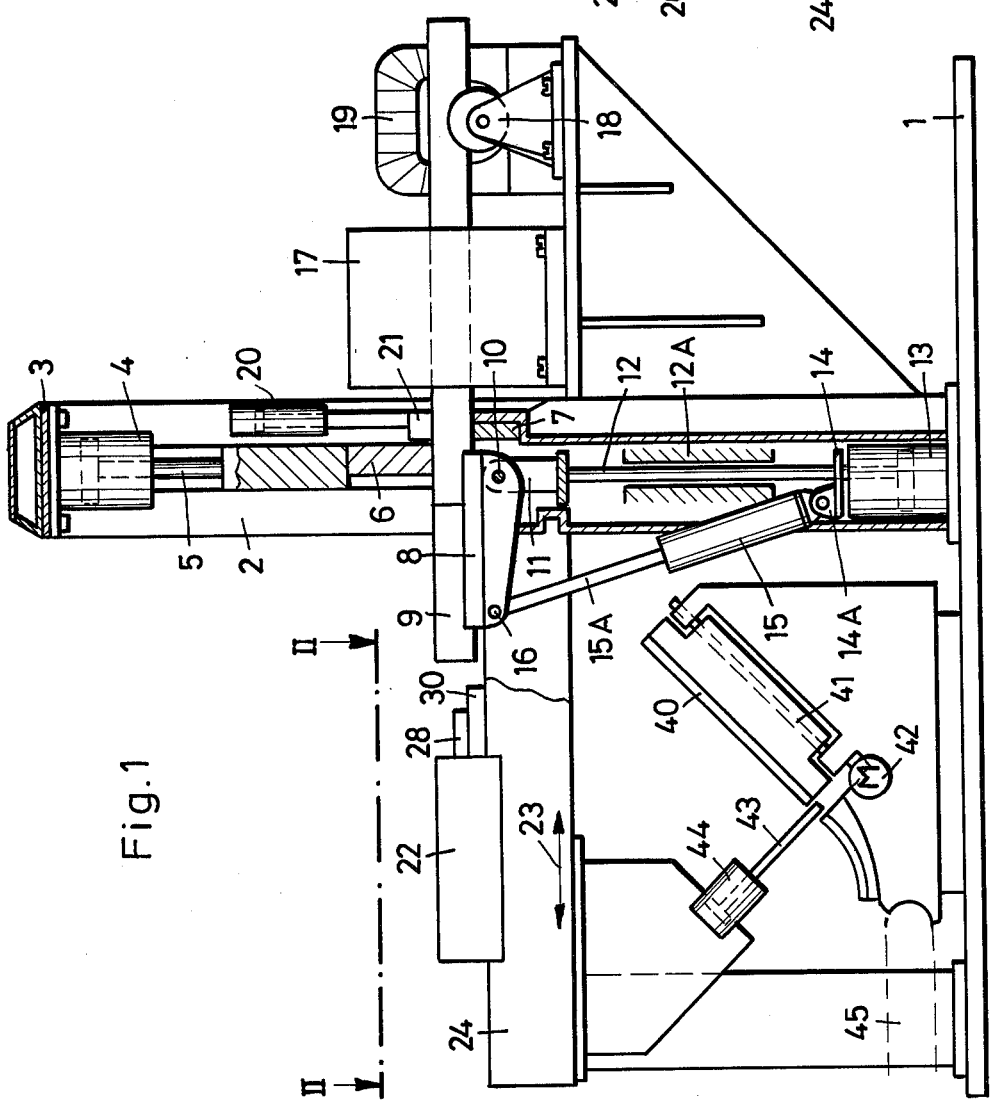

APPARATUS FOR SHEARING METALLIC BARS

The invention relates to a shearing apparatus for shearing bars preferably heated bars of finite length and metallic raw material.

With such devices a transportation device precedes the shearing apparatus for transportation of the bars in the longitudinal direction. A stop following the shearing apparatus in the longitudinal direction of the bars is adjustable in the longitudinal direction of the bars for limiting the movement of the bars. A clamping device clamps the bars in the shearing position and a device removes the sheared off bars from the shearing position, the stop being liftable by means of a motor drive by shifting the stop in the longitudinal direction of the bars.

Shearing devices of this type serve among other things for cutting hot bars to a size for forging presses in which it is necessary that the sheared off ends of the bars maintain their precise theoretical length, since otherwise breakdowns of the production process may occur. Thus, for example, parts of bars which are too long and are fed to a die, may destroy said die.

For controlling the length of the sheared-off workpieces it is possible, therefore, to attach to the shearing apparatus a control apparatus in an automatic production line for determining the length of the individual workpieces, which device ascertains any over or under sizing of the theoretical length and eliminates unsuitable workpieces from the production process. However, such separated measuring arrangements lengthen the production line, as a result of which a reheating of the sheared-off material, on hot-shears which feed the forging press, will be necessary.

The invention, therefore, deals with the object of developing an apparatus of the type described above so that bar remnants which are no longer shearable — either ones which are too short or ones which are sufficiently long but are no longer safely shearable — are detected and eliminated from the work process.

According to the invention, this object is attained by a shearing apparatus of the type described above in which, in the direction of transportation of the bars behind the shearing apparatus, an apparatus is provided for gripping the bar material in the shearing off position and in order to exercise a pulling or pressing force on a bar in the direction of transportation of the bars. An apparatus for signalling transporation movement of the bar from its shearing-off position is provided with the clamp.

With the present invention, remnants of bars, the length of which is shorter than the pertinent theoretical length, as well as bar remnants the length of which is longer than the pertinent theoretical length, but is not sufficient for carrying out a perfect clamping, can be detected without any need for special length measuring means. The gripping arrangement at the same time may be developed like tongs, and the arrangement may be made such that the adjustable stop and the gripping arrangement are adjustably mounted by joint transporting means in the longitudinal bar direction.

In a further development, the stop device and the gripping device are mounted on a common carriage in the longitudinal direction of the bars by way of a gear mechanism which is adjustable by means of a motor.

The attached drawing serves as an explanation of a preferred embodiment by way of an example.

FIG. 1 shows a shearing-off apparatus of the present invention in side view and partial section; and FIG. 2 shows the apparatus of FIG. 1 in a partial presentation in top view in the direction of II—II.

U-shaped frame 2 stands upright with its legs mounted on a base plate 1, and includes an element 3 which connects the legs and mounts a hydraulic reciprocating engine 4. Reciprocating engine 4 shifts the upper knife 6 of the shearing apparatus. Knife 6 is adjustably mounted in height in slits 5 in the two legs of frame 2. Upper knife 6 is adjustable as against a lower knife 7, which is mounted locally fixed between the two legs of the frame 2.

A support 8 for the workpiece is disposed behind the shearing plane defined by upper knife 6 and lower knife 7 and serves for mounting the bar 9 to be sheared off. Workpiece support 8 is tiltably mounted around an axis of rotation 10. The axis of rotation 10 is disposed in a fork-shaped bearing 11, which is attached to a rod 12 and is mounted shiftably in the longitudinal direction of the rod, counter to the force of a pneumatic reciprocating engine 13. Rod 12 carries a bearing plate 14, which serves for the attachment of a doubly impingeable reciprocating piston 15. Reciprocating piston 15 is rotatably articulated by its housing to plate 14 at axis of rotation 14A. Axis of rotation 14A runs parallel to axis of rotation 10. Rod 15A of reciprocating piston 15 is rotatably articulated at the free end of the workpiece support 8 at axis of rotation 16 which runs parallel to axis of rotation 10.

A continuous induction furnace 17 is series connected to the shearing plane of the shearing off arrangement and through which the shearing bar 9 passes. Transportation roller 18 serves for the transportation of the shearing bar, which may be driven by means of an electric motor 19.

A hydraulic reciprocating piston 20 is impingeable on both sides and is mounted between the legs of frame 2 for the operation of clamp 21. Clamp 21 is adjustable in height in relation to the surface of the shearing bar 9 and serves for clamping down of bar 9 in its shearing position.

Carriage 22 is adjustable in the direction of the double arrow 23 on support 24, the longitudinal adjustment of which is possible by means of an electric driving motor 25, gear 26 and screw spindles 27. Spindles 27 are rotatable in their longitudinal direction by means of the gear mechanisms 26. Carriage 22 carries a mechanical stop 28 and a mechanical gripping device 29 which is equipped with tong-like gripping elements 30. Gripping elements 30 may be opened and closed by means of a hydraulic control engine 31 by way of a pertinent control device, whereby the closed gripping elements 30 grasp the shearing bar 9 and clamp it down firmly.

An electric terminal position switch 32 cooperates with the gripping device 29 and signals a terminal position of the gripping device in which the tongs 30 are closed.

Tongs 30 are disposed such that they seize bar 9 when it comes into contact on stop 28, and are able in a closed state to transmit a tractive force to the shearing bar 9.

Guide 40 for the workpiece is disposed below machine frame 24, and is mounted to be rotatable around the axis of rotation 41, and is tiltable by means of an electric motor 42 around axis 41. Mechanical locking slide 43 may be moved into the path of the workpiece guide 40 by means of a hydraulic reciprocating piston 44. Slide 43 blocks the path along guide 40 to a conveyor belt 45 coupled on the outlet side, which serves for the transportation of the workpieces which have been cut to length to a forge press etc., coupled on the outlet side.

When locking slide 43 is switched on, guide 40 for the workpiece, may be tilted around axis of rotation 41 out of the plane of the drawing, as a result of which, workpieces disposed on the guide 40 may be fed to a second conveyor belt (not shown) for delivery to another processing machine or for discharge as waste.

The shearing arrangement described, operates as follows. The preheated bar 9, consisting for example of steel, is fed by means of roller 18 and motor 19 to induction furnace 17 and is heated there to beyond the required forging temperature. The heated bar reaches the stop 28 by way of the shearing plane of the upper or lower knife of the shearing arrangement, and is clamped down firmly in this position by operation of the reciprocating piston 20 by means of the clamp 21 in its shearing-off position. The pertinent machine-control arrangement thereupon operates motor 25 which lifts carriage 22 together with the stop 28, attached to it by a little amount from the shearing bar 9 as a result of which the latter rests freely on the workpiece support 8, which bears a prismatic guide. At the same time, the gripping device 30 is closed by operation of the reciprocating engine 31, and the tong-like elements 30 seize the length of bar on the workpiece support 8 and transmit a pertinent tractive force to bar 9.

Whenever the part length of the bar 9 resting on the workpiece support 8 is so small that it can no longer be clamped down by the clamp 21, and be held firmly, then this remnant of the bar is pulled by means of the gripping device 30 in the direction of the carriage 22, and the electric terminal switch device 32 is activated, which delivers a corresponding signal to the control arrangement of the machine. The control mechanism releases the gripping device 30, activates the reciprocating piston 15 and tilts the workpiece support 8 by rotating around the axle 10 of rotation into a position in which a too short workpiece reaches the workpiece guide 40. Simultaneously the slide mechanism 43, 44 have been activated, which prevents the transportation of the too short workpiece onto the conveyor belt 45, and causes the incorrectly dimensioned workpiece to be eliminated as waste by tilting the workpiece guide 40 around the axle 41 by means of the piston 42.

If, on the other hand, the part length of the bar 9, resting on the workpiece support 8, still has a sufficient length to carry out the shearing process, then the terminal switching device 32 is not activated and care is taken by means of a time switch, that — after a predetermined time — the gripping device 30 is released and the reciprocating engine 4 is activated, with lifted stop 28, for the introduction of the shearing-off process.

At the same time, the upper knife if lowered down with a predetermined adjusting force to the surface of the bar 9, the bar is sheared off, and at the same time the workpiece support 8 is lowered, counter to the force of the reciprocating engine 13 somewhat, while maintaining the horizontal position of the workpiece support. This lowering process ensures a bur-free and straight cutting plane on the bar 9.

After completion of the shearing process, the reciprocating piston 15 is again activated, the workpiece support 8 is rotated around its axle 10 and the workpiece, cut to length, is fed via the workpiece guide 40 to the conveyor belt 45.

After completion of this process the described checking process and shearing process is repeated, in so far as the part of the bar that is to be sheared off is subjected by means of clamp 21 to a sufficient clamping effect. If this clamping effect were missing or if it were not sufficiently strong, then the workpiece seized by means of the gripping device 29, 30, 31 will be pulled forward in the direction of transportation and would be eliminated by operation of the terminal position contact 32 via the tilting of the workpiece support 8.

The described embodiment has the advantage that control for a sufficient length is accomplished by control of the clamping effect of clamp 21. In this way it will be assured that even workpieces, which are still clampingly seized but are no longer sufficiently fixated in their position, are discovered, and eliminated from the shearing process. Such workpieces may then be brought to the required workpiece length possibly by sawing and then delivered to their intended use.

It is within the scope of the invention to replace the gripping device 29, 30, 31 by, for example, a thrust-device attached, for example, on the frame 2, which instead of the tractive forces transmits compression forces on the rod, running in the direction of transportation of the bar 9. Otherwise, the arrangement is made such that bars 9, from which always part-lengths must be sheared off, is fed continuously and abuttingly to the shears, so that shorter remnants of bar are transported through the shears by the subsequent bar.

Other embodiments and modifications can be made without departing from the scope of the present invention, and that scope is, therefore, limited only by the scope of the appended claims.

What is claimed is:

1. A shearing apparatus for shearing heated metal into bars comprising:
   means for transporting said material in the longitudinal direction;
   means for clamping said material in a shearing position;
   stop means for limiting the longitudinal movement of said bars;
   means for shearing a bar in the shearing position;
   means behind said shearing means for exerting a force on said bar in said longitudinal direction; and
   means for detecting movement of said bar from said force to indicate that the bar is incorrectly dimensioned.

2. An apparatus as in claim 1, wherein said force exerting means includes a pair of tongs.

3. An apparatus as in claim 1, wherein said force exerting means includes a motor and a gear operating said tongs.

4. An apparatus as in claim 1, further including a workpiece support, means for pivotably mounting said support, an inclined bar guide for receiving bars from said support, a locking slide movable to a position blocking movement of said bar down said guide and means for pivotably tilting said guide to remove bars blocked on said guide.

* * * * *